(12) United States Patent
Eguchi

(10) Patent No.: US 11,416,355 B2
(45) Date of Patent: Aug. 16, 2022

(54) RELAY SYSTEM

(71) Applicant: FUJIFILM Business Innovation Corp., Tokyo (JP)

(72) Inventor: Hiroyuki Eguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 166 days.

(21) Appl. No.: 16/568,165

(22) Filed: Sep. 11, 2019

(65) Prior Publication Data

US 2020/0097375 A1    Mar. 26, 2020

(30) Foreign Application Priority Data

Sep. 20, 2018  (JP) .............................. JP2018-176618

(51) Int. Cl.
*G06F 11/20*  (2006.01)
*G06F 11/34*  (2006.01)
*G06F 11/07*  (2006.01)

(52) U.S. Cl.
CPC ...... *G06F 11/2023* (2013.01); *G06F 11/0703* (2013.01); *G06F 11/0751* (2013.01); *G06F 11/3442* (2013.01); *G06F 11/0733* (2013.01); *G06F 2201/85* (2013.01)

(58) Field of Classification Search
CPC ............. G06F 11/2023; G06F 11/0703; G06F 11/3442; G06F 11/0733; G06F 2201/85; G06F 11/0751

See application file for complete search history.

(56) References Cited

U.S. PATENT DOCUMENTS

| | | | |
|---|---|---|---|
| 7,324,438 B1* | 1/2008 | Savoldi | H04L 41/0631 370/216 |
| 2010/0146045 A1* | 6/2010 | Moore | G06F 3/067 709/203 |
| 2011/0078697 A1* | 3/2011 | Smittle | G06F 9/384 718/104 |
| 2013/0179895 A1* | 7/2013 | Calder | G06F 9/5077 718/104 |
| 2013/0239115 A1* | 9/2013 | Kato | G06F 9/5061 718/104 |
| 2015/0242214 A1* | 8/2015 | Busaba | G06F 9/467 712/207 |
| 2018/0300174 A1* | 10/2018 | Karan | G06F 9/4881 |
| 2019/0205164 A1* | 7/2019 | Kumar | G06F 9/5083 |

FOREIGN PATENT DOCUMENTS

JP          2014149690          8/2014

OTHER PUBLICATIONS

Office Action of Japan Counterpart Application, with English translation thereof, dated May 31, 2022, pp. 1-3.

* cited by examiner

*Primary Examiner* — Bryce P Bonzo
*Assistant Examiner* — Michael Xu
(74) *Attorney, Agent, or Firm* — JCIPRNET

(57) ABSTRACT

A relay system includes a detector that detects occurrence of failure related to a processor that reads and processes requests from a memory, a monitor that monitors statuses of the requests stored in the memory and gives an instruction to increase or reduce a computational resource depending on the statuses of the requests stored in the memory, and a controller that performs control in response to detection of the failure by the detector so that a status of the memory is set to a state in which the monitor determines that addition of the computational resource is unnecessary.

13 Claims, 26 Drawing Sheets

FIG. 8

| REQUEST ID | REQUEST STATUS | PLUG-IN SERVICE ID | PLUG-IN SERVICE STATUS |
|---|---|---|---|
| REQ00001 | VISIBLE | PLUG001 | ACTIVE |

FIG. 10

| REQUEST ID | REQUEST STATUS | PLUG-IN SERVICE ID | PLUG-IN SERVICE STATUS |
|---|---|---|---|
| REQ00001 | VISIBLE | PLUG001 | ACTIVE |
| REQ00002 | VISIBLE | PLUG001 | ACTIVE |
| REQ00003 | VISIBLE | PLUG002 | ACTIVE |
| REQ00004 | VISIBLE | PLUG001 | ACTIVE |

FIG. 12

| REQUEST ID 501 | REQUEST STATUS 502 | PLUG-IN SERVICE ID 503 | PLUG-IN SERVICE STATUS 504 | 500 |
|---|---|---|---|---|
| REQ00001 | INVISIBLE | PLUG001 | INACTIVE | |
| REQ00002 | INVISIBLE | PLUG001 | INACTIVE | |
| REQ00003 | VISIBLE | PLUG002 | ACTIVE | |
| REQ00004 | INVISIBLE | PLUG001 | INACTIVE | |

[ ] STATUS CHANGED ALONG WITH FAILURE DETECTION

FIG. 13

| REQUEST ID | REQUEST STATUS | PLUG-IN SERVICE ID | PLUG-IN SERVICE STATUS |
|---|---|---|---|
| REQ00001 | INVISIBLE | PLUG001 | INACTIVE |
| REQ00002 | INVISIBLE | PLUG001 | INACTIVE |
| REQ00003 | VISIBLE | PLUG002 | ACTIVE |
| REQ00004 | INVISIBLE | PLUG001 | INACTIVE |
| REQ00005 | INVISIBLE | PLUG001 | INACTIVE |

REQ00001–REQ00004: REQUESTS LISTED WHEN FAILURE IS DETECTED DURING WAITING PERIOD

REQ00005: NEW REQUEST INPUT AFTER FAILURE DETECTION

FIG. 17

| REQUEST ID | REQUEST STATUS | PLUG-IN SERVICE ID | PLUG-IN SERVICE STATUS |
|---|---|---|---|
| REQ00001 | INVISIBLE | PLUG001 | INACTIVE |
| REQ00002 | INVISIBLE | PLUG001 | INACTIVE |
| REQ00003 | VISIBLE | PLUG002 | ACTIVE |
| REQ00004 | INVISIBLE | PLUG001 | INACTIVE |

FIG. 18

| REQUEST ID | REQUEST STATUS | PLUG-IN SERVICE ID | PLUG-IN SERVICE STATUS |
|---|---|---|---|
| REQ00001 | VISIBLE | PLUG001 | ACTIVE |
| REQ00002 | INVISIBLE | PLUG001 | INACTIVE |
| REQ00003 | VISIBLE | PLUG002 | ACTIVE |
| REQ00004 | INVISIBLE | PLUG001 | INACTIVE |

CHANGED STATUS

FIG. 19

| REQUEST ID | REQUEST STATUS | PLUG-IN SERVICE ID | PLUG-IN SERVICE STATUS |
|---|---|---|---|
| REQ00001 | INVISIBLE | PLUG001 | INACTIVE |
| REQ00002 | INVISIBLE | PLUG001 | INACTIVE |
| REQ00003 | VISIBLE | PLUG002 | ACTIVE |
| REQ00004 | INVISIBLE | PLUG001 | INACTIVE |

500, 501, 502, 503, 504

CHANGED STATUS

FIG. 21

| REQUEST ID | REQUEST STATUS | PLUG-IN SERVICE ID | PLUG-IN SERVICE STATUS |
|---|---|---|---|
| REQ00002 | INVISIBLE | PLUG001 | INACTIVE |
| REQ00003 | VISIBLE | PLUG002 | ACTIVE |
| REQ00004 | INVISIBLE | PLUG001 | INACTIVE |

FIG. 22

| REQUEST ID | REQUEST STATUS | PLUG-IN SERVICE ID | PLUG-IN SERVICE STATUS |
|---|---|---|---|
| REQ00002 | VISIBLE | PLUG001 | ACTIVE |
| REQ00003 | VISIBLE | PLUG002 | ACTIVE |
| REQ00004 | INVISIBLE | PLUG001 | INACTIVE |

501 — REQUEST ID
502 — REQUEST STATUS
503 — PLUG-IN SERVICE ID
504 — PLUG-IN SERVICE STATUS
500

⬚ CHANGED STATUS

FIG. 23

| REQUEST ID | REQUEST STATUS | PLUG-IN SERVICE ID | PLUG-IN SERVICE STATUS |
|---|---|---|---|
| REQ00002 | VISIBLE | PLUG001 | ACTIVE |
| REQ00003 | VISIBLE | PLUG002 | ACTIVE |
| REQ00004 | INVISIBLE | PLUG001 | INACTIVE |
| REQ00005 | INVISIBLE | PLUG001 | INACTIVE |

FIG. 26

| REQUEST ID | REQUEST STATUS | PLUG-IN SERVICE ID | PLUG-IN SERVICE STATUS |
|---|---|---|---|
| REQ00002 | VISIBLE | PLUG001 | ACTIVE |
| REQ00003 | VISIBLE | PLUG002 | ACTIVE |
| REQ00004 | VISIBLE | PLUG001 | ACTIVE |

500

501 502 503 504

CHANGED STATUS

FIG. 27

| REQUEST ID | REQUEST STATUS | PLUG-IN SERVICE ID | PLUG-IN SERVICE STATUS |
|---|---|---|---|
| REQ00002 | VISIBLE | PLUG001 | ACTIVE |
| REQ00003 | VISIBLE | PLUG002 | ACTIVE |
| REQ00004 | VISIBLE | PLUG001 | ACTIVE |
| REQ00005 | VISIBLE | PLUG001 | ACTIVE |

500

501 502 503 504

RELAY SYSTEM

CROSS-REFERENCE TO RELATED APPLICATIONS

This application is based on and claims priority under 35 USC 119 from Japanese Patent Application No. 2018-176618 filed Sep. 20, 2018.

BACKGROUND (i) Technical Field

The present disclosure relates to a relay system.

(ii) Related Art

There is provided a system having a function of monitoring operation conditions of job processing apparatuses and increasing tasks of any one job processing apparatus when the number of processes of the job processing apparatuses exceeds a reference.

Japanese Unexamined Patent Application Publication No. 2014-149690 is an example of related art.

SUMMARY

Aspects of non-limiting embodiments of the present disclosure relate to the following circumstances. In a system in which an instruction is given so as to increase or reduce computational resources depending on conditions of requests, additional computational resources may be allocated even if requests increase due to failure.

It is desirable to suppress allocation of additional computational resources even if requests increase due to failure.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a relay system comprising a detector that detects occurrence of failure related to a processor that reads and processes requests from a memory, a monitor that monitors statuses of the requests stored in the memory and gives an instruction to increase or reduce a computational resource depending on the statuses of the requests stored in the memory, and a controller that performs control in response to detection of the failure by the detector so that a status of the memory is set to a state in which the monitor determines that addition of the computational resource is unnecessary.

BRIEF DESCRIPTION OF THE DRAWINGS

An exemplary embodiment of the present disclosure will be described in detail based on the following figures, wherein:

FIG. 8 illustrates an example of a status table for use in management of a status of a request;

FIG. 10 illustrates an example of the status table of requests stored in queues before failure detection;

FIG. 12 illustrates an example of the status table after failure detection;

FIG. 13 illustrates an example of the status table including a new request input after failure detection;

FIG. 17 illustrates the status table before processing of Step 1 of FIG. 16;

FIG. 18 illustrates the status table after the processing of Step 1 of FIG. 16;

FIG. 19 illustrates an example of the status table of requests stored in the queues in Step 6 of FIG. 16;

FIG. 21 illustrates the status table after a notification of request processing completion has been given;

FIG. 22 illustrates the status table after processing of Step 5 of FIG. 20;

FIG. 23 illustrates the status table after processing of Step 8 of FIG. 20;

FIG. 26 illustrates an example of the status table after processing of Step 3 of FIG. 24; and FIG. 27 illustrates an example of the status table after processing of Step 8 of FIG. 24.

DETAILED DESCRIPTION

An exemplary embodiment of the present disclosure is described below with reference to the drawings.

Exemplary Embodiment

<System Configuration>

Figure 1:
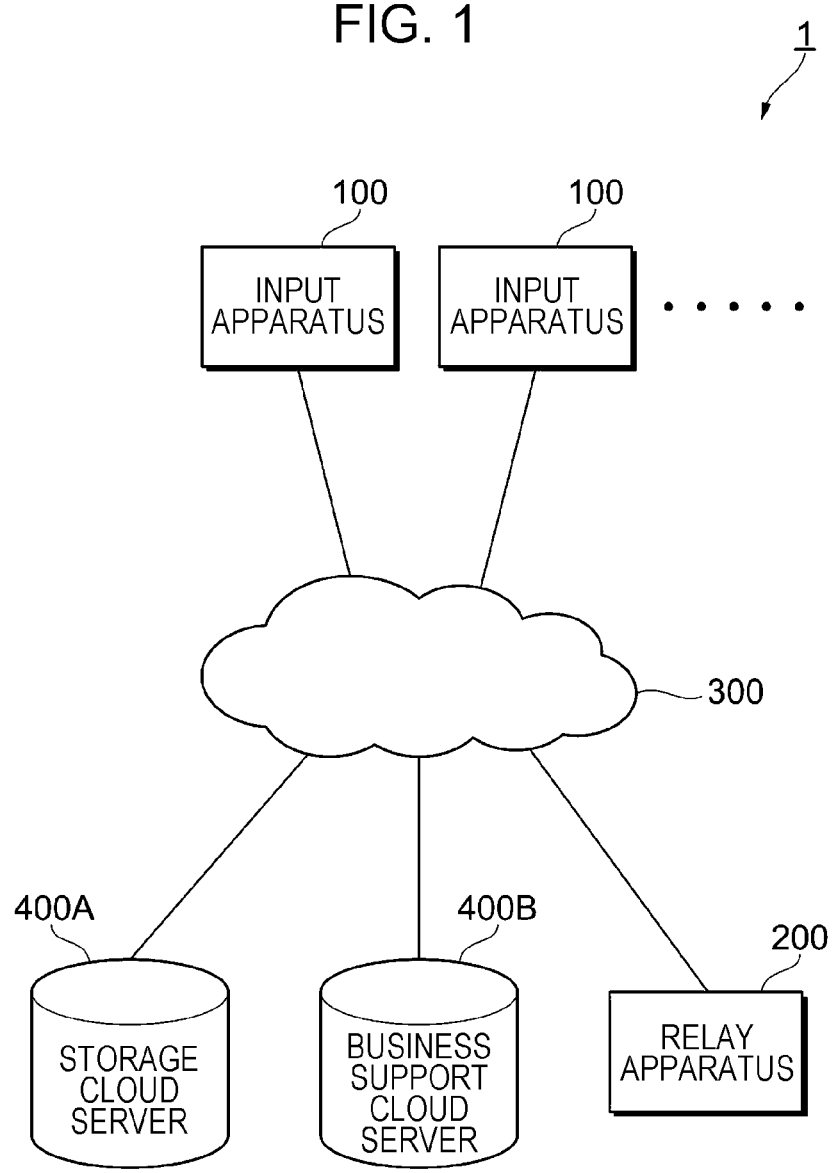
FIG. 1 illustrates an example of the configuration of a cloud cooperation system according to an exemplary embodiment.

FIG. 1 illustrates an example of the configuration of a cloud cooperation system 1 according to the exemplary embodiment.

The cloud cooperation system 1 includes input apparatuses 100 that request document processing, a relay apparatus 200 that processes requests received from the input apparatuses 100 to achieve cooperation with services on a cloud (hereinafter referred to also as "cloud service"), a cloud network 300, and a storage cloud server 400A and a business support cloud server 400B that are examples of the cloud service.

The relay apparatus 200 is an example of a relay system and is connected to the cloud network 300.

The input apparatus 100 is a terminal to be operated by a user registered in the cloud service. In this exemplary embodiment, the input apparatus 100 is assumed to be, for example, an image processing apparatus or a smartphone.

For example, the image processing apparatus is provided with a FAX function for transmitting and receiving FAX documents, a copying function for producing copies, a scanning function for reading images of documents, and a printing function for printing images on paper or other recording media. The image processing apparatus need not have all the functions but may specialize in any one function.

In this exemplary embodiment, the FAX document is used in the meaning of a document containing a photograph, characters, or a graphical object to be transmitted and received by facsimile.

For example, the input apparatus 100 is used for directly registering a scanned document in a cloud service desired by the user. For example, the input apparatus 100 is used for searching a plurality of cloud services for a document desired by the user to print out the document. For example, the input apparatus 100 is used for printing a document file or an image file without using a print driver or a computer.

In the case of FIG. 1, the input apparatus 100 and the relay apparatus 200 are independent of each other but the relay apparatus 200 may be built into the input apparatus 100.

<Configuration of Relay Apparatus>

Figure 2:
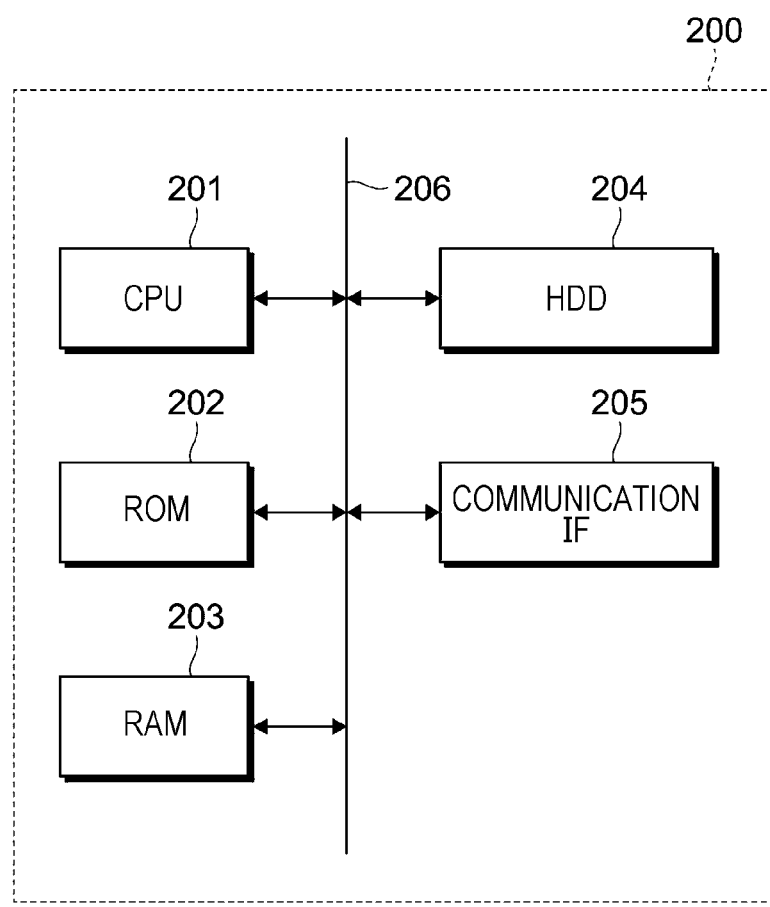
FIG. 2 illustrates an example of the hardware configuration of a relay apparatus according to the exemplary embodiment.

FIG. 2 illustrates an example of the hardware configuration of the relay apparatus 200 according to the exemplary embodiment.

The relay apparatus 200 illustrated in FIG. 2 has a configuration of a so-called computer.

Therefore, the relay apparatus 200 includes a CPU 201 that controls the entire apparatus through execution of programs (including firmware), a ROM 202 that stores programs such as a basic input/output system (BIOS), a RAM 203 for use as a program execution area, a hard disk drive (HDD) 204 that stores programs to be executed by the CPU 201, image data, management data, and the like, and a communication interface (communication IF) 205 for use in communication with the outside.

Those parts are connected together through a bus 206 or signal lines (not illustrated).

Figure 3:
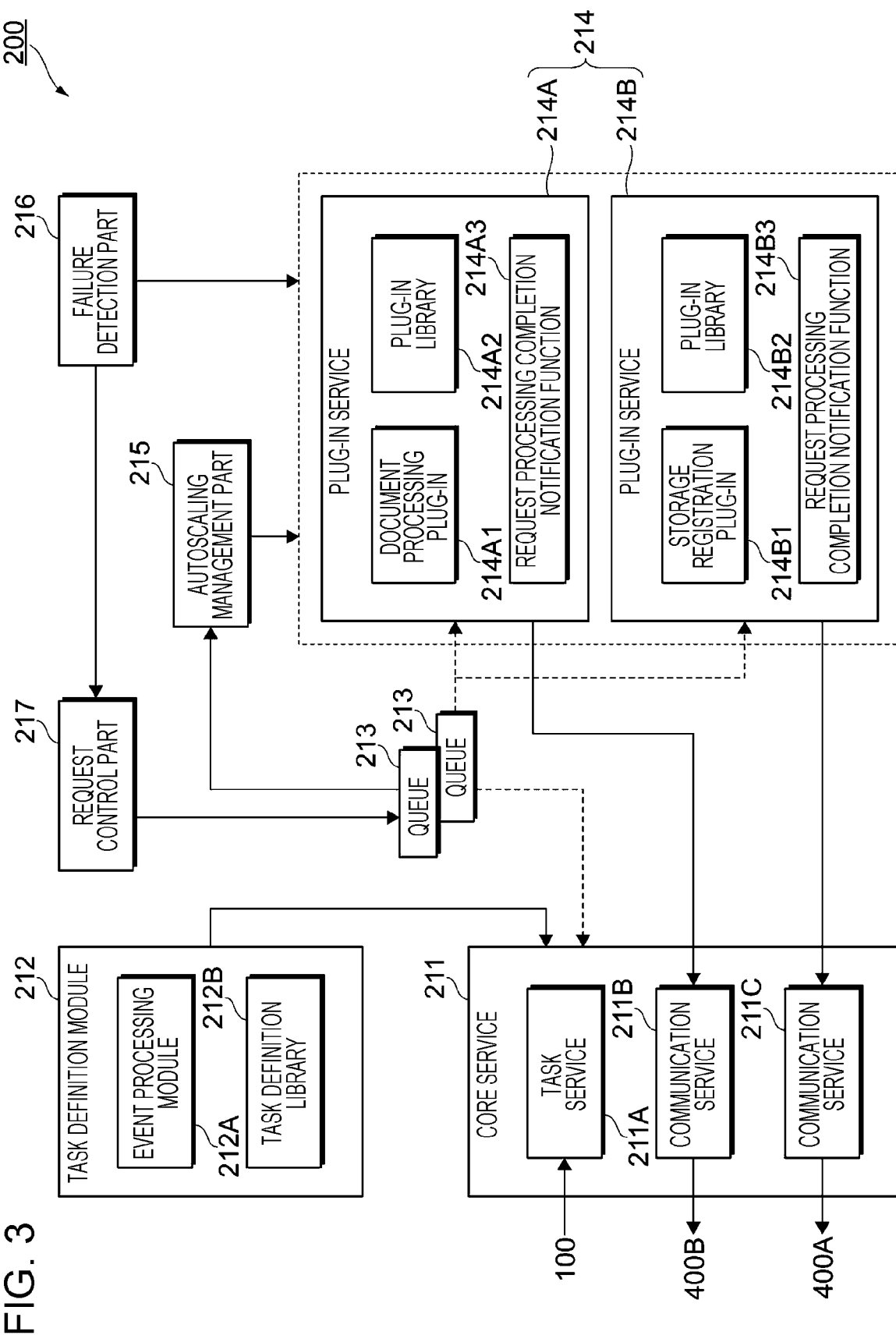
FIG. 3 illustrates an example of the functional configuration of the relay apparatus.

FIG. 3 illustrates an example of the functional configuration of the relay apparatus 200.

Functions illustrated in FIG. 3 are implemented through execution of programs by the CPU 201 (see FIG. 2).

The relay apparatus 200 illustrated in FIG. 3 includes a core service 211 that manages communication between the inside and the outside, a task definition module 212 that stores definitions of tasks, queues 213 that hold call requests for plug-in services 214 that process documents, the plug-in services 214 that process documents based on requests, an autoscaling management part 215 that manages the start and stop of the plug-in services 214 based on the number of requests held in the queues 213, a failure detection part 216 that detects failure caused by the cloud servers or the plug-in services 214 that process the requests held in the queues 213, and a request control part 217 that controls statuses of the queues 213 so that autoscaling is not executed when the number of unprocessed requests increases due to the occurrence of failure.

The start of the plug-in service 214 involves adding a computational resource on the cloud network. The stop of the plug-in service 214 involves freeing a computational resource on the cloud network. The autoscaling management part 215 manages the start and stop.

For example, the computational resource is an execution environment for operating an application such as a plug-in service.

In this exemplary embodiment, all the functions illustrated in FIG. 3 are implemented by the single relay apparatus 200 but may be implemented by cooperation among a plurality of processing apparatuses. In this case, the plurality of processing apparatuses that cooperate with each other are examples of the relay system. Each of the plurality of processing apparatuses that cooperate with each other may have the hardware configuration illustrated in FIG. 2. All the functions need not be implemented through execution of programs. That is, the functions may partially be implemented as logic circuits.

<Core Service 211>

The core service 211 includes a task service 211A that communicates with the input apparatus 100, a communication service 211B that communicates with the business support cloud server 400B, and a communication service 211C that communicates with the storage cloud server 400A.

The task service 211A starts an event processing module 212A of the task definition module 212 based on a notification or request received from the input apparatus 100 (see FIG. 1) to acquire a task for fulfilling the request.

The "task" is a series of operations to be executed by one or a plurality of plug-in services 214. In a task definition library 212B, combinations of plug-in services 214 to be called are recorded in addition to the tasks.

Figure 4:
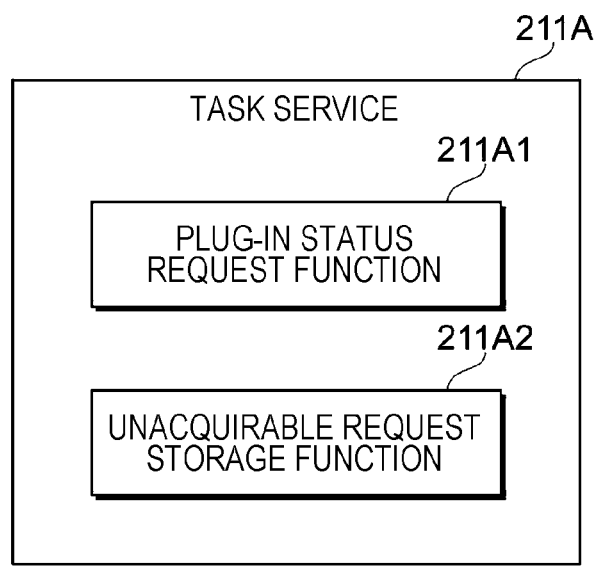
FIG. 4 illustrates an example of functions provided in a task service.

FIG. 4 illustrates an example of functions provided in the task service 211A.

The task service 211A of this exemplary embodiment includes a plug-in status request function 211A1 and an unacquirable request storage function 211A2.

The plug-in status request function 211A1 requests a status of the plug-in service 214 (see FIG. 3) from the request control part 217 (see FIG. 3) based on a request from the input apparatus 100 (see FIG. 1) and the definition of a task.

If the status of the plug-in service 214 that is confirmed by a response from the request control part 217 is "inactive", the unacquirable request storage function 211A2 sets the status of the request stored in the queue 213 (see FIG. 3) to become "invisible" to the autoscaling management part 215.

In other words, the request stored in the queue 213 after failure detection is controlled to become invisible to the autoscaling management part 215. As a result, if unprocessed requests accumulated while being held in the queue 213 increase but the accumulation is caused by failure, the autoscaling management part 215 does not erroneously determine that the processing capability is insufficient. That is, the autoscaling management part 215 can be prevented from adding the plug-in service 214 (see FIG. 3) while failure is detected.

The description returns to FIG. 3.

<Queue 213>

The queue 213 is an example of a memory that holds a request to call the plug-in service 214.

In this exemplary embodiment, the queue 213 is prepared for each plug-in service 214. As described later, the queue 213 may be shared among a plurality of plug-in services 214.

<Plug-in Service 214>

A plurality of types of plug-in service 214 are provided depending on details of processing to be executed. Examples of the plug-in service 214 include a plug-in service 214A for use in document processing and a plug-in service 214B for use in registration of documents in the storage.

The plug-in service 214A includes a document processing plug-in 214A1, a plug-in library 214A2, and a request processing completion notification function 214A3.

The plug-in service 214B includes a storage registration plug-in 214B1, a plug-in library 214B2, and a request processing completion notification function 214B3.

Each of the request processing completion notification functions 214A3 and 214B3 notifies the request control part 217 of completion of processing related to a request.

The plug-in service 214 is an example of a processor that reads and processes a request from the queue 213. The storage cloud server 400A (see FIG. 1) and the business support cloud server 400B (see FIG. 1) that process the request are also examples of the processor.

<Autoscaling Management Part 215>

The autoscaling management part 215 manages the start and stop of the plug-in service based on the number of requests held in the queues 213.

If the number of requests held in the queues 213 is larger than a predetermined value (first value), the autoscaling management part 215 additionally secures a computational resource and then starts a new plug-in service 214. If the number of requests held in the queues 213 is smaller than a predetermined value (second value), the autoscaling management part 215 partially stops the plug-in services 214 and then frees a surplus of the secured computational resources. That is, the number of plug-in services 214 is increased or reduced depending on the number of unprocessed requests. The first value is larger than the second value.

The autoscaling management part 215 of this exemplary embodiment counts the number of visible requests. Thus, a request set to an invisible state is excluded from targets to be counted by the autoscaling management part 215.

Therefore, also when unprocessed requests continue to increase due to trouble with the plug-in service 214 or the cloud server, the requests may be excluded from counting targets to avoid starting the plug-in service 214 that does not contribute to reduction of the number of accumulated requests. The trouble with the cloud server is independent of the trouble with the plug-in service 214.

The autoscaling management part 215 is an example of a monitor that monitors statuses of requests held in the queues 213.

<Failure Detection Part 216>

The failure detection part 216 monitors logs of the plug-in services 214 or the like to detect the occurrence of failure involving a stop of operation (so-called fatal error) and recovery from the failure. The failure detection part 216 is an example of a detector.

Figure 5:
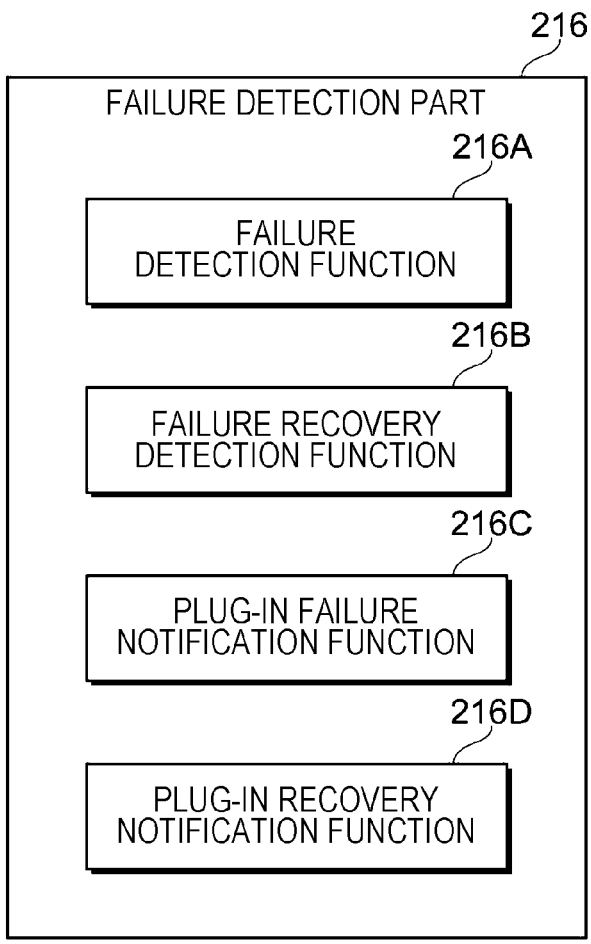
FIG. 5 illustrates an example of functions provided in a failure detection part.

FIG. 5 illustrates an example of functions provided in the failure detection part 216.

The failure detection part 216 of this exemplary embodiment includes a failure detection function 216A, a failure recovery detection function 216B, a plug-in failure notification function 216C, and a plug-in recovery notification function 216D.

The failure detection function 216A monitors the logs of the plug-in services 214 (see FIG. 3) to detect a failure message. In this exemplary embodiment, the failure to be detected involves a stop of operation of the plug-in service 214. Thus, a message indicating failure that does not involve the stop of operation of the plug-in service 214 may be excluded from detection targets.

The failure recovery detection function 216B monitors the logs of the plug-in services 214 to detect recovery from failure. In this exemplary embodiment, the recovery from failure means that a state in which a message indicating failure involving a stop of operation of the plug-in service 214 (failure message) is detected is switched to a state in which a message indicating normal operation (normal operation message) is detected. Thus, the failure recovery detection function 216B detects the normal operation message.

The plug-in failure notification function 216C is used for notifying the request control part 217 (see FIG. 3) of information on the plug-in service 214 whose operation is stopped.

The plug-in recovery notification function 216D is used for notifying the request control part 217 of information on the plug-in service 214 whose recovery has been detected.

The description returns to FIG. 3.

<Request Control Part 217>

The request control part 217 controls statuses of processing requests held in the queues 213 based on a notification from the failure detection part 216. Specifically, the request control part 217 performs control so that a status of a request to call a specific plug-in service 214 for which a failure notification is given is set to "invisible" and so that a status of a request to call a specific plug-in service 214 for which a notification of recovery from failure is given is set to "visible".

As described above, "visible" or "invisible" is determined depending on whether the request is counted by the autoscaling management part 215. Thus, a request controlled to become invisible is handled as not existing in the queue 213 for the autoscaling management part 215.

The request control part 217 is an example of a controller.

Figure 6:
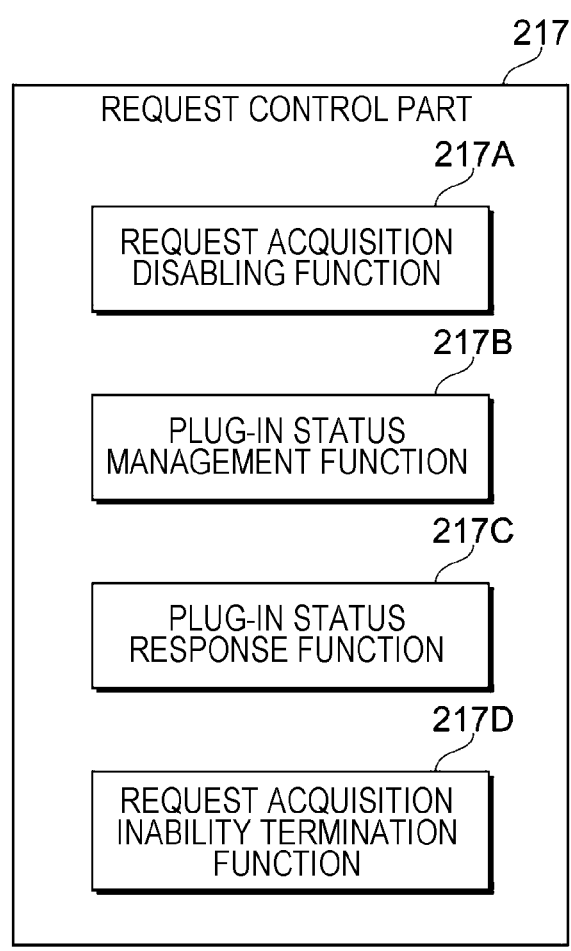
FIG. 6 illustrates an example of functions provided in a request control part.

FIG. 6 illustrates an example of functions provided in the request control part 217.

The request control part 217 of this exemplary embodiment includes a request acquisition disabling function 217A, a plug-in status management function 217B, a plug-in status response function 217C, and a request acquisition inability termination function 217D.

If the failure detection part 216 (see FIG. 3) has given a notification of failure involving a stop of operation of a specific plug-in service 214, the request acquisition disabling function 217A controls a status of a request related to the specific plug-in service 214 to become "invisible". In other words, the request controlled to become invisible is not acquirable from the queue 213.

For a request related to a plug-in service 214 having no failure involving a stop of operation, the request acquisition disabling function 217A does not change a status of the request to "invisible". That is, the request acquisition disabling function 217A selectively controls the statuses of requests.

The plug-in status management function 217B performs management based on a notification from the failure detection part 216 (see FIG. 3) so that a status of the plug-in service 214 is set to "active" or "inactive" in management information on a request held in the queue 213 (see FIG. 3). The management information includes information indicating whether the request is visible or invisible and information indicating whether the plug-in service 214 that processes the request is active or inactive.

If the notification from the failure detection part 216 (see FIG. 3) is a failure notification, the plug-in status management function 217B changes the management information related to the specific plug-in service 214 of the notification target to "inactive".

If the notification from the failure detection part 216 (see FIG. 3) is a recovery notification, the plug-in status management function 217B changes the management information related to the specific plug-in service 214 of the notification target to "active".

The plug-in status response function 217C responds to an inquiry from the task service 211A about whether the inquired plug-in service 214 is active or inactive.

If the notification from the failure detection part 216 is the recovery notification, the request acquisition inability termination function 217D performs control so that a status of the request to be processed by the specific plug-in service 214 of the notification target among the requests held in the queue 213 is set to "visible". In other words, the request acquisition inability termination function 217D terminates an invisible state.

<Processing Operations of Relay Apparatus 200>

Processing operations to be executed by the relay apparatus 200 are described below for respective operation conditions of the plug-in service 214 (see FIG. 3).

<Operation in Case in which No Failure Occurs>

Figure 7:
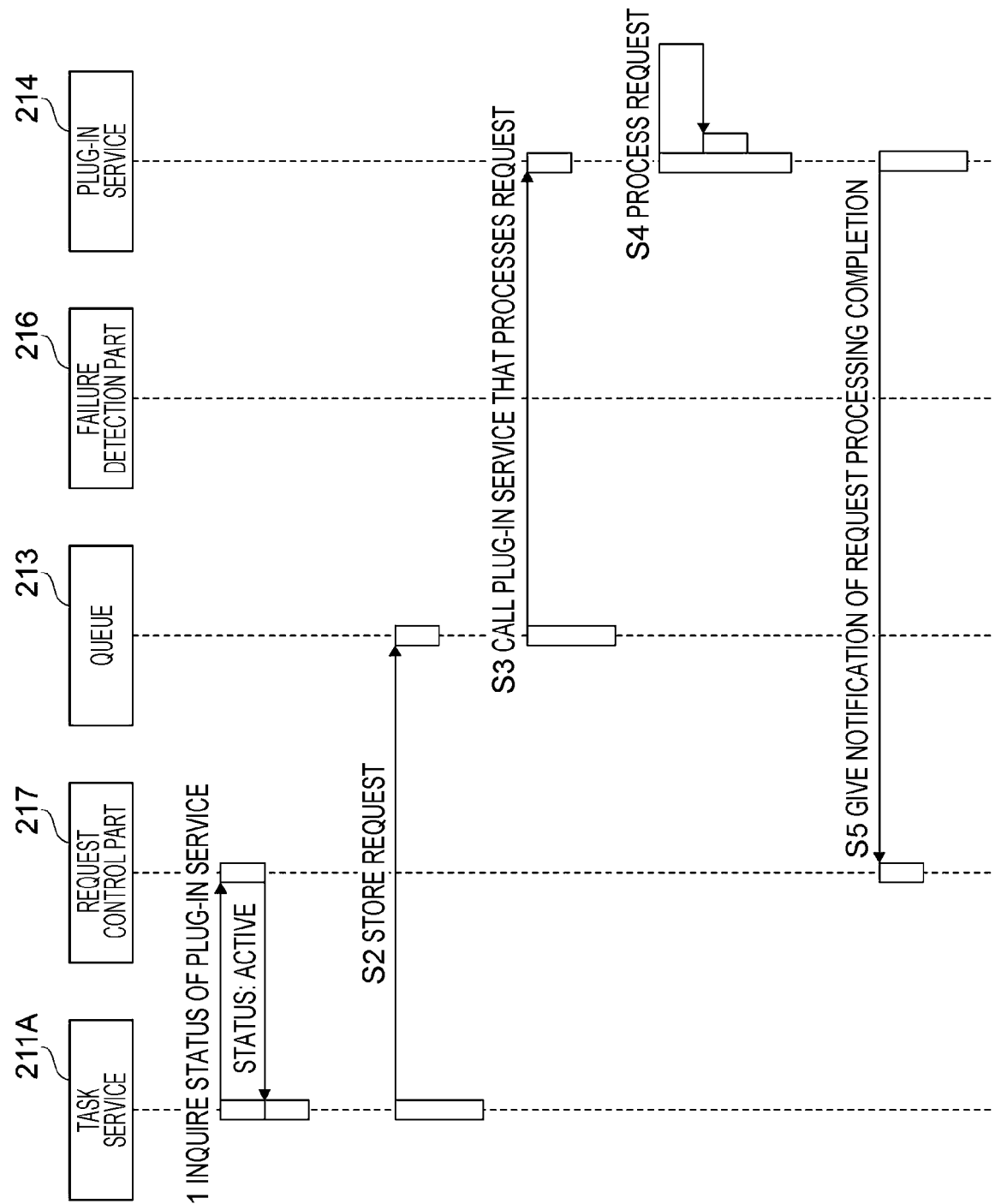
FIG. 7 illustrates an example of a sequence in a case in which no failure occurs in any plug-in service.

FIG. 7 illustrates an example of a sequence in a case in which no failure occurs in any plug-in service.

The sequence illustrated in FIG. 7 shows communication between the task service 211A, the queue 213, the plug-in service 214, the failure detection part 216, and the request control part 217.

The symbol "S" in the figure represents "step".

Step 1

The task service 211A that has received a processing request from the input apparatus 100 (see FIG. 3) acquires information on the plug-in service 214 for use in the processing of the received request through the task definition module 212.

Next, the task service 211A inquires of the request control part 217 about an operation status of the plug-in service 214 for use in the processing of the request. For example, if the request is made for a business support cloud service, the task service 211A inquires an operation status of the plug-in service 214A (see FIG. 3).

In the case of FIG. 7, the task service 211A receives a status response "active" from the request control part 217.

Step 2

The task service 211A stores the processing request in the queue 213.

FIG. 8 illustrates an example of a status table 500 for use in management of a status of the request. The status table 500 corresponds to the management information described above.

The status table 500 includes a request ID 501, a request status 502, a plug-in service ID 503, and a plug-in service status 504.

In the case of FIG. 8, the managed request is a single request having a request ID of "REQ00001" and its status is "visible". The plug-in service for use in the processing of the request has an ID of "PLUG001" and its status is "active".

The description returns to FIG. 7.

Step 3

The queue 213 calls the plug-in service 214 that processes the request.

The plug-in service 214 to be called is identified by the plug-in service ID 503 (see FIG. 8).

Step 4

The plug-in service 214 processes the request.

Step 5

When completion of the processing has been detected, the plug-in service 214 notifies the request control part 217 of the request processing completion.

By receiving the notification, the request control part 217 grasps that the plug-in service 214 that has transmitted the notification is operating normally.

<Operation 1 in Case in Which Failure Has Occurred in Plug-In Service>

Figure 9:
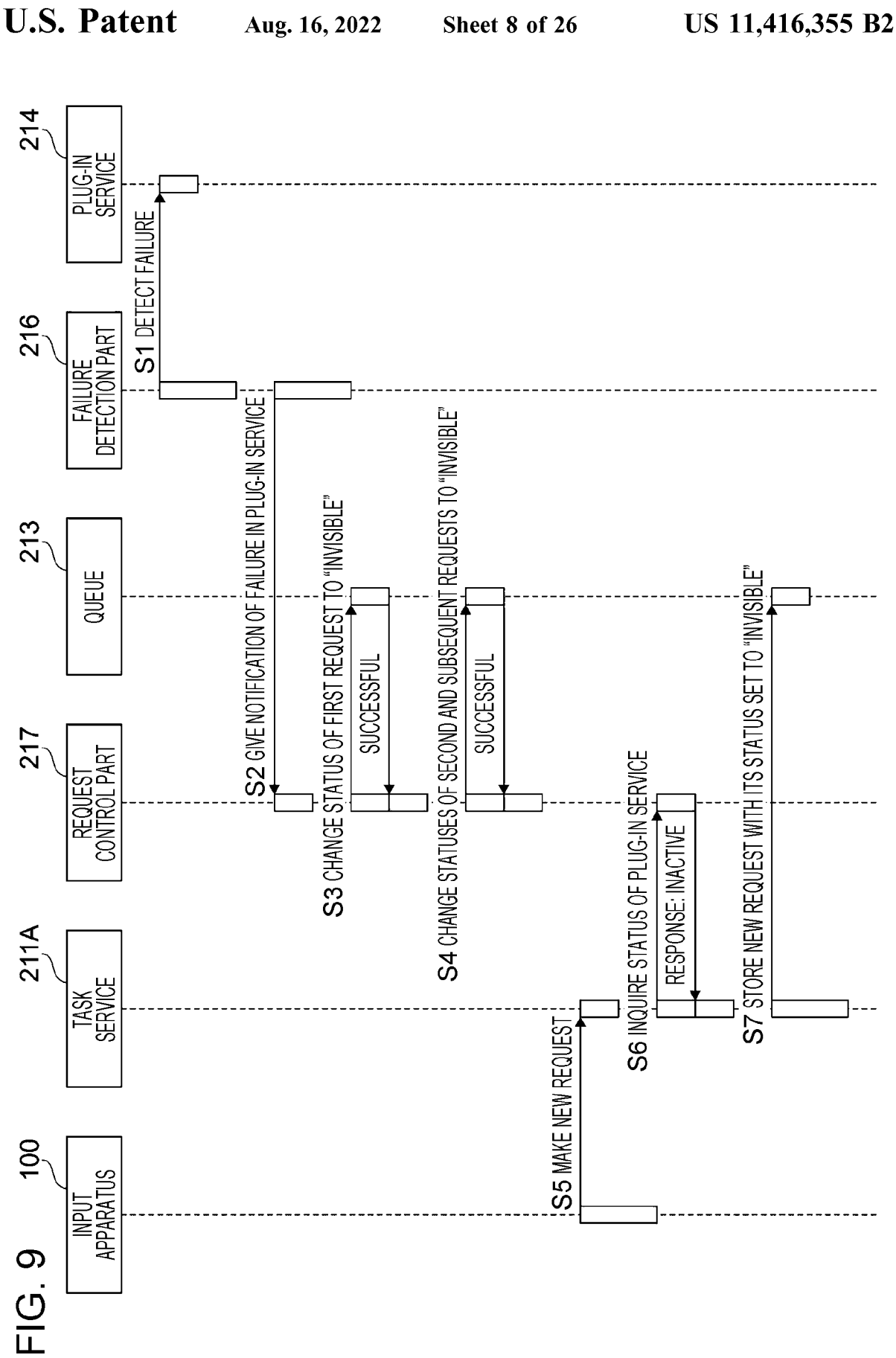
FIG. 9 illustrates an example of a sequence in a case in which failure has occurred in a plug-in service.

FIG. 9 illustrates an example of a sequence in a case in which failure has occurred in the plug-in service 214.

The sequence illustrated in FIG. 9 shows communication between the input apparatus 100, the task service 211A, the queue 213, the plug-in service 214, the failure detection part 216, and the request control part 217.

The symbol "S" in the figure represents "step".

Step 1

The failure detection part 216 detects failure involving a stop of operation.

FIG. 10 illustrates an example of the status table 500 of requests stored in the queues 213 (see FIG. 3) before failure detection. In FIG. 10, parts corresponding to those in FIG. 8 are represented by the corresponding reference symbols.

In the case of FIG. 10, four requests having IDs of "REQ00001", "REQ00002", "REQ00003", and "REQ00004" are stored in the queues 213.

Three out of the four requests are processed by the plug-in service 214 having the plug-in service ID 503 of "PLUG001" and the remaining one request is processed by a plug-in service 214 having a plug-in service ID 503 of "PLUG002".

Since the failure has not been detected yet, the request status 502 of every request is "visible". The plug-in service status 504 is "active".

The description returns to FIG. 9.

Step 2

The failure detection part 216 notifies the request control part 217 of the failure in the plug-in service 214.

Figure 11:
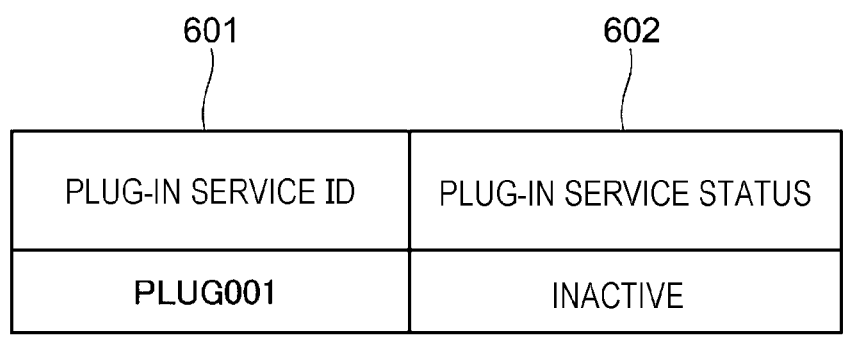
FIG. 11 illustrates an example of the data structure of a failure notification.

FIG. 11 illustrates an example of the data structure of the failure notification. The failure notification includes a plug-in service ID 601 for identifying the plug-in service 214 in which the failure has occurred and a plug-in service status 602.

In the case of FIG. 11, the plug-in service ID 601 is "PLUG001" and the plug-in service status 602 is "inactive".

Step 3

The request control part 217 notified of the failure changes the status of the first request stored in the queue 213 to "invisible". The queue 213 replies to the request control part 217 that the status has been changed successfully.

Step 4

The request control part 217 changes the statuses of the second and subsequent requests to "invisible" until the request control part 217 confirms that the first request is processed successfully. The queue 213 replies to the request control part 217 that the statuses have been changed successfully.

FIG. 12 illustrates an example of the status table 500 after failure detection. In FIG. 12, parts corresponding to those in FIG. 10 are represented by the corresponding reference symbols.

In the case of FIG. 12 as well, the four requests are still stored in the queues 213 and there is no change in number compared with FIG. 10.

In FIG. 12, the failure has been detected for the plug-in service 214 having the plug-in service ID of "PLUG001" and therefore all the statuses of the corresponding requests are changed to "invisible". All the plug-in service statuses 504 corresponding to the plug-in service 214 having the plug-in service ID of "PLUG001" are changed to "inactive".

The status of the request that uses the plug-in service 214 in which the failure involving the stop of operation is not detected, that is, the plug-in service 214 having the plug-in service ID 503 of "PLUG002" remains "visible". The plug-in service status 504 of the plug-in service for use in the processing of the request remains "active".

The description returns to FIG. 9.

Step 5

The following description is directed to an operation in a case in which a new request is input from the input apparatus 100 to the task service 211A after the failure in the plug-in service 214 has been detected.

Step 6

The task service 211A that has received the new request from the input apparatus 100 acquires information on the plug-in service 214 for use in processing of the received request through the task definition module 212. Then, the task service 211A inquires of the request control part 217 about the operation status of the plug-in service 214 for use in the processing of the request.

In the example of FIG. 9, it is assumed that the new request needs to call the plug-in service 214 in which the failure involving the stop of operation is detected. Therefore, the task service 211A receives a response "inactive".

Step 7

In the case of FIG. 9, the task service 211A stores the new request in the queue 213 with its status set to "invisible".

FIG. 13 illustrates an example of the status table 500 including the new request input after failure detection.

In FIG. 13, parts corresponding to those in FIG. 12 are represented by the corresponding reference symbols.

In the case of FIG. 13, the new request has a request ID 501 of "REQ00005" and the request status 502 of the new request is set to "invisible".

The plug-in service ID for identifying the plug-in service 214 for use in the processing of the request is "PLUG001" and therefore the plug-in service status 504 is "inactive".

In the example of FIG. 13, the queue 213 holds the request (REQ00003) that uses the plug-in service 214 (see FIG. 9) that is active when the new request is stored in the queue 213 (see FIG. 9). If the processing has been completed, the request (REQ00003) is deleted from the queue 213.

As illustrated in FIG. 13, the requests that use the plug-in service 214 in which the failure involving the stop of operation has occurred continue to increase in the queue 213 until the plug-in service 214 recovers from the failure. Since the request statuses 502 are set to "invisible", the autoscaling management part 215 does not add a computational resource and a plug-in service 214 in order to accelerate the processing of the requests accumulated in the queue 213.

<Operation 2 in Case in which Failure has Occurred in Plug-In Service>

Description is made of another example of the operation in the case in which failure has occurred in the plug-in service 214.

Figure 14:
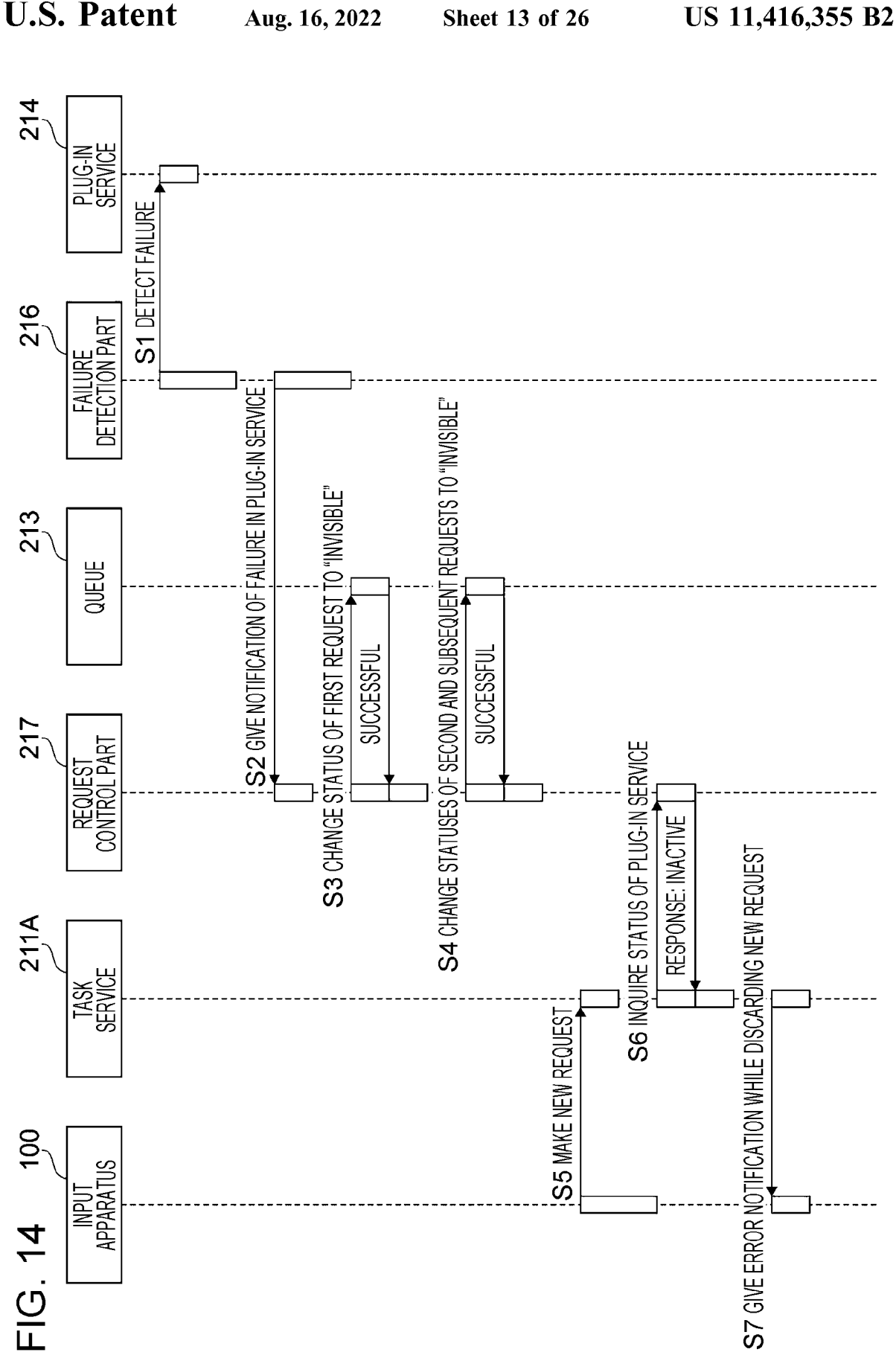
FIG. 14 illustrates another example of the sequence in the case in which failure has occurred in a plug-in service.

FIG. 14 illustrates another example of the sequence in the case in which failure has occurred in the plug-in service 214.

The sequence illustrated in FIG. 14 shows communication between the input apparatus 100, the task service 211A, the queue 213, the plug-in service 214, the failure detection part 216, and the request control part 217.

The symbol "S" in the figure represents "step".

Step 1 to Step 4

Details and procedures of operations of Step 1 to Step 4 of FIG. 14 are identical to those of FIG. 9. That is, the request control part 217 notified of the failure involving the stop of operation changes all the statuses of the requests that use the plug-in service 214 in which the failure has been detected to "invisible" among the requests stored in the queue 213.

Step 5 to Step 7

When a new request is input from the input apparatus 100 to the task service 211A after the failure involving the stop of operation has been detected, the task service 211A inquires of the request control part 217 about the status of the plug-in service 214 that processes the request.

In this case, the task service 211A receives a response indicating that the status of the plug-in service 214 that processes the request is "inactive". Up to this operation, the operations are identical to those described in FIG. 9.

The subsequent operation is different. The task service 211A discards the received new request without storing the request in the queue 213 and gives an error notification to the input apparatus 100 that has transmitted the request.

Figure 15:
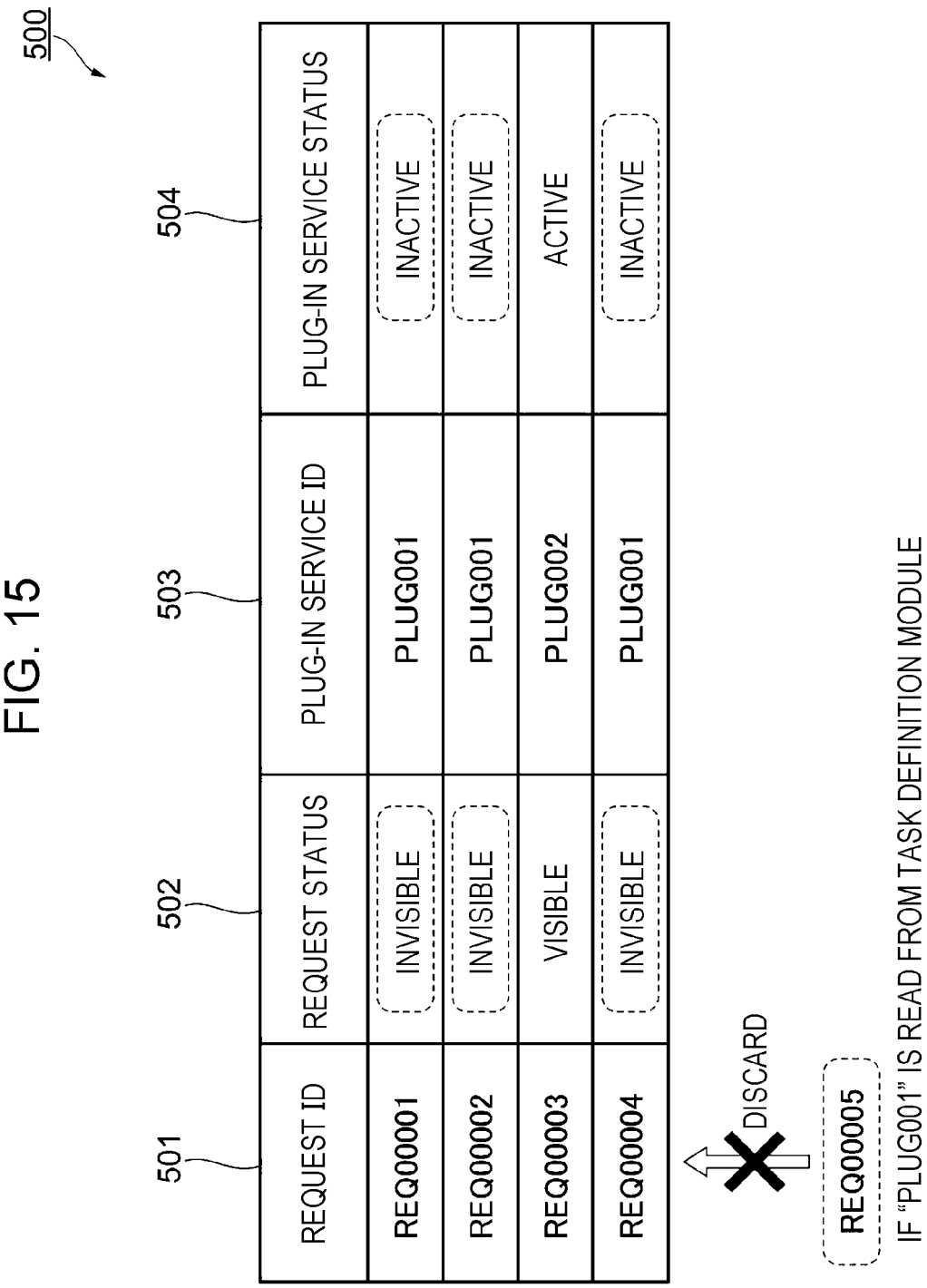
FIG. 15 illustrates an example of the status table including a new request input after failure detection.

FIG. 15 illustrates an example of the status table 500 including the new request input after failure detection.

In FIG. 15, parts corresponding to those in FIG. 13 are represented by the corresponding reference symbols.

In the case of FIG. 15, the request ID 501 corresponding to the new request is "REQ00005". In this example, the failure has occurred in the plug-in service 214 to be called for the new request and therefore the new request is discarded without being added to the queue 213. Therefore, the fifth request is not stored in the status table 500 of the queue 213 as in the case of FIG. 13.

If no failure occurs in the plug-in service 214 to be called for the new request, the new request is stored in the queue 213 without being discarded. Examples of this case include a case in which the plug-in service ID 503 of the plug-in service to be read for the request is "PLUG002".

If the new request that uses the plug-in service 214 in which the failure has occurred is discarded without being stored in the queue 213 as in this operation example, the autoscaling management part 215 does not add a computational resource and a plug-in service 214 in order to accelerate the processing of the requests accumulated in the queue 213.

By giving the error notification to the input apparatus 100, the output of the same request from the input apparatus 100 is suppressed.

<Operation 1 after Failure has been Detected>

Description is made of an example of an operation after failure has been detected.

As described above, all the statuses of the requests that use the plug-in service 214 in which the failure has occurred are changed to "invisible" among the requests stored in the queue 213 when the failure has been detected. The new request input after failure detection is stored in the queue 213 with its status set to "invisible" or is discarded without being stored in the queue 213.

The following description is directed to subsequent operations.

Figure 16:
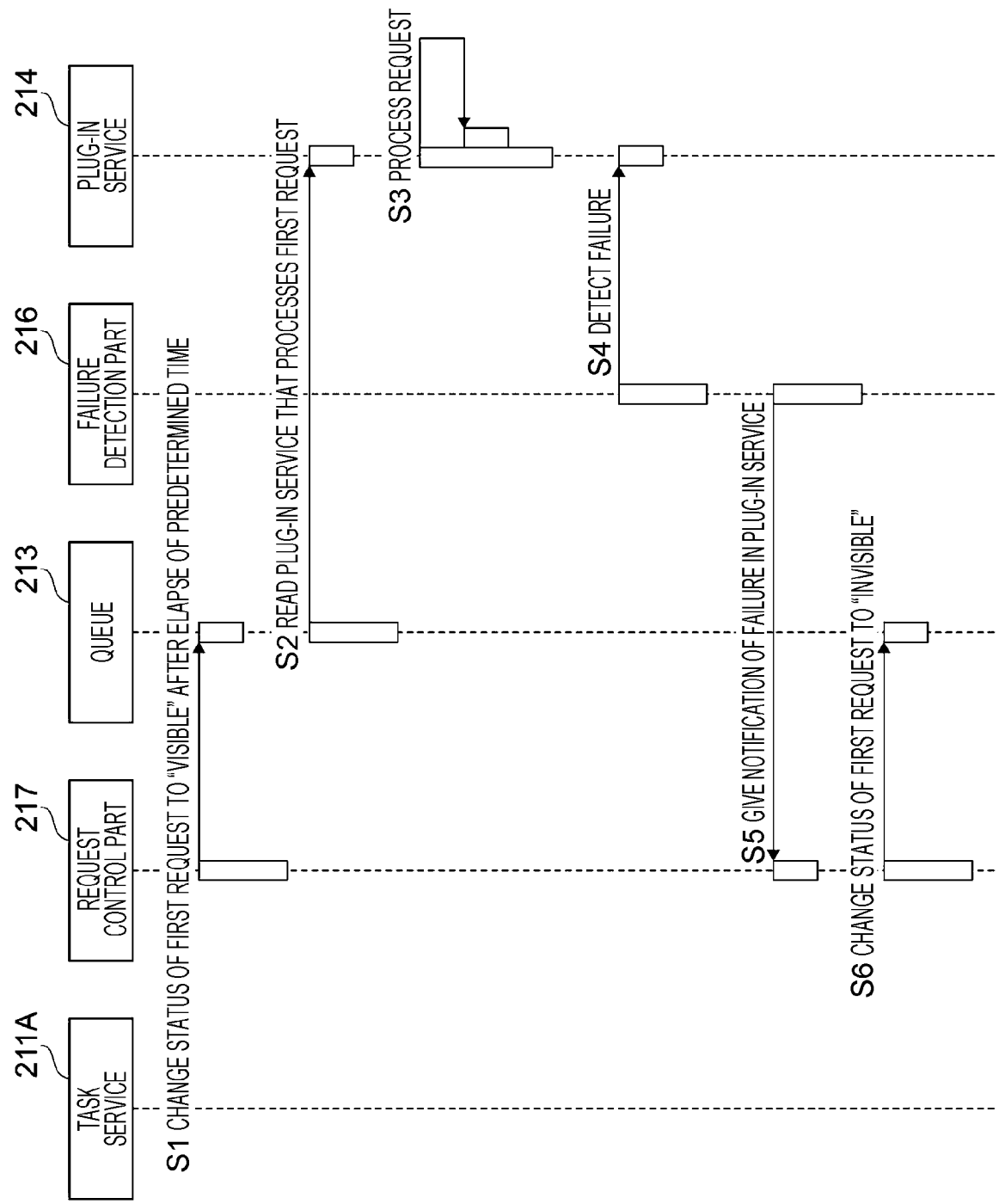
FIG. 16 illustrates an example of a sequence to be executed after the failure in the plug-in service has been detected.

FIG. 16 illustrates an example of a sequence to be executed after the failure in the plug-in service 214 has been detected.

The sequence illustrated in FIG. 16 shows communication between the task service 211A, the queue 213, the plug-in service 214, the failure detection part 216, and the request control part 217.

Step 1

When a predetermined time has elapsed from the failure detection, the request control part 217 changes the status of the first request to "visible" in the status table 500.

FIG. 17 illustrates the status table 500 before the processing of Step 1 of FIG. 16.

FIG. 18 illustrates the status table 500 after the processing of Step 1 of FIG. 16.

The status table 500 illustrated in FIG. 17 corresponds to the status table 500 illustrated in FIG. 15. The status of the first request "REQ00001" is "invisible" and the status of the plug-in service 214 for use in the processing of the first request is "inactive".

In this operation example, the request control part 217 changes the status of the first request "REQ00001" to "visible". In FIG. 18, the status of the plug-in service 214 is also changed to "active".

The description returns to FIG. 16.

Step 2

Since the status of the first request is changed to "visible" in the status table 500, the queue 213 reads the plug-in service 214 written for the first request. The queue 213 reads the plug-in service 214 having the plug-in service ID of "PLUG001".

Step 3

The read plug-in service 214 processes the request.

Step 4

The failure detection part 216 detects failure in the read plug-in service 214 again.

Step 5

The failure detection part 216 notifies the request control part 217 of the failure in the plug-in service 214.

Step 6

The request control part 217 changes the status of the first request stored in the queue 213 to "invisible".

FIG. 19 illustrates an example of the status table 500 of the requests stored in the queues 213 (see FIG. 3) in Step 6 of FIG. 16. In FIG. 19, parts corresponding to those in FIG. 18 are represented by the corresponding reference symbols.

In the case of FIG. 19, the called plug-in service 214 has not recovered from the failure and therefore the request status 502 corresponding to the first request returns to "invisible". The status of the corresponding plug-in service 214 also returns to "inactive".

In this sequence example, the status of the first request alone is changed from "invisible" to "visible" in Step 1 but the statuses of all the requests to call the plug-in service having the same plug-in service ID 503 as that of the first request may also be changed from "invisible" to "visible".

When the failure is detected in Step 4 and the status of the request is returned to "invisible", it is appropriate that the statuses of the other requests be returned to "invisible" as well.

<Operation 2 after Failure has been Detected>

Description is made of a case in which the plug-in service 214 called before a recovery notification is given completes processing the request.

Figure 20:
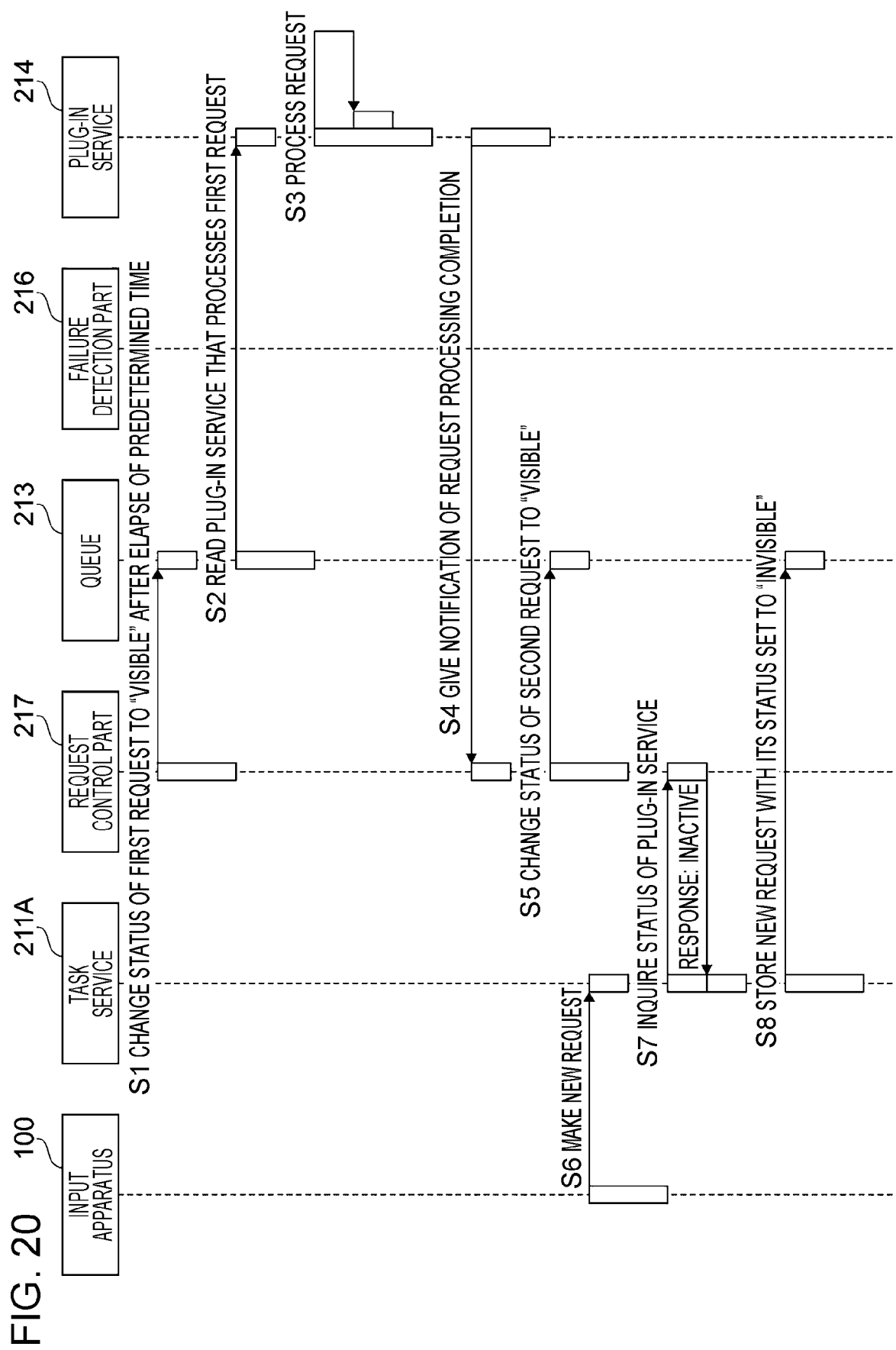
FIG. 20 illustrates an example of the sequence to be executed after the failure in the plug-in service has been detected.

FIG. 20 illustrates an example of the sequence to be executed after the failure in the plug-in service 214 has been detected.

The sequence illustrated in FIG. 20 shows communication between the input apparatus 100, the task service 211A, the queue 213, the plug-in service 214, the failure detection part 216, and the request control part 217.

Step 1 to Step 3

Details and procedures of operations of Step 1 to Step 3 of FIG. 20 are identical to those of FIG. 16. That is, when the predetermined time has elapsed from the failure detection, the status of the first request managed as "invisible" is changed to "visible". Then, the corresponding plug-in service 214 is read and starts to process the request.

Step 4

In this example, the read plug-in service 214 operates to process the request and therefore the plug-in service 214 notifies the request control part 217 of request processing completion.

FIG. 21 illustrates the status table 500 after the notification of the request processing completion has been given.

In the case of FIG. 21, the request whose request ID is "REQ00001" and whose processing has been completed is deleted and the request having the request ID of "REQ00002" and located in the second row of the status table 500 illustrated in FIG. 19 moves to the first row of the status table 500. Each of the positions of the other two requests in the status table 500 also moves up by one row.

Step 5

Next, the request control part 217 instructs the queue 213 to change the status of the second request to "visible".

The term "second" means that the request is located in the second row in Step 1.

Thus, the request corresponds to the first request in the status table 500 after the request having the request ID of "REQ00001" has been deleted from the status table 500.

FIG. 22 illustrates the status table 500 after the processing of Step 5 of FIG. 20.

In the status table 500 illustrated in FIG. 22, the status of the request managed to have the request ID of "REQ00002" is changed to "visible". In the example of FIG. 22, the status of the plug-in service 214 corresponding to the request managed to have the request ID of "REQ00002" is also changed from "inactive" to "active".

The status of the request managed to have the request ID of "REQ00004" remains "invisible".

This sequence example shows an operation before recovery from the failure is detected by the failure detection part 216 and therefore the statuses are changed one by one.

Step 6

The task service 211A receives a new request from the input apparatus 100.

Step 7

The task service 211A inquires of the request control part 217 about the status of the plug-in service 214 to be used by the received request. The task service 211A receives a response "inactive".

Step 8

The task service 211A stores the new request in the queue 213 with its status set to "invisible".

FIG. 23 illustrates the status table 500 after the processing of Step 8 of FIG. 20.

In the case of FIG. 23, the new request is managed as "REQ00005". The plug-in service 214 for use in processing of "REQ00005" is "PLUG001". The request control part 217 is not notified of recovery from the failure in "PLUG001". Therefore, "invisible" is stored as the status of the request managed as "REQ00005" and "inactive" is stored as the status of the plug-in service 214.

In this sequence example, an attempt is made to process the requests while carrying out a check one by one even before the recovery is detected by the failure detection part 216.

<Operation in Case in which Recovery from Failure has been Detected>

Figure 24:
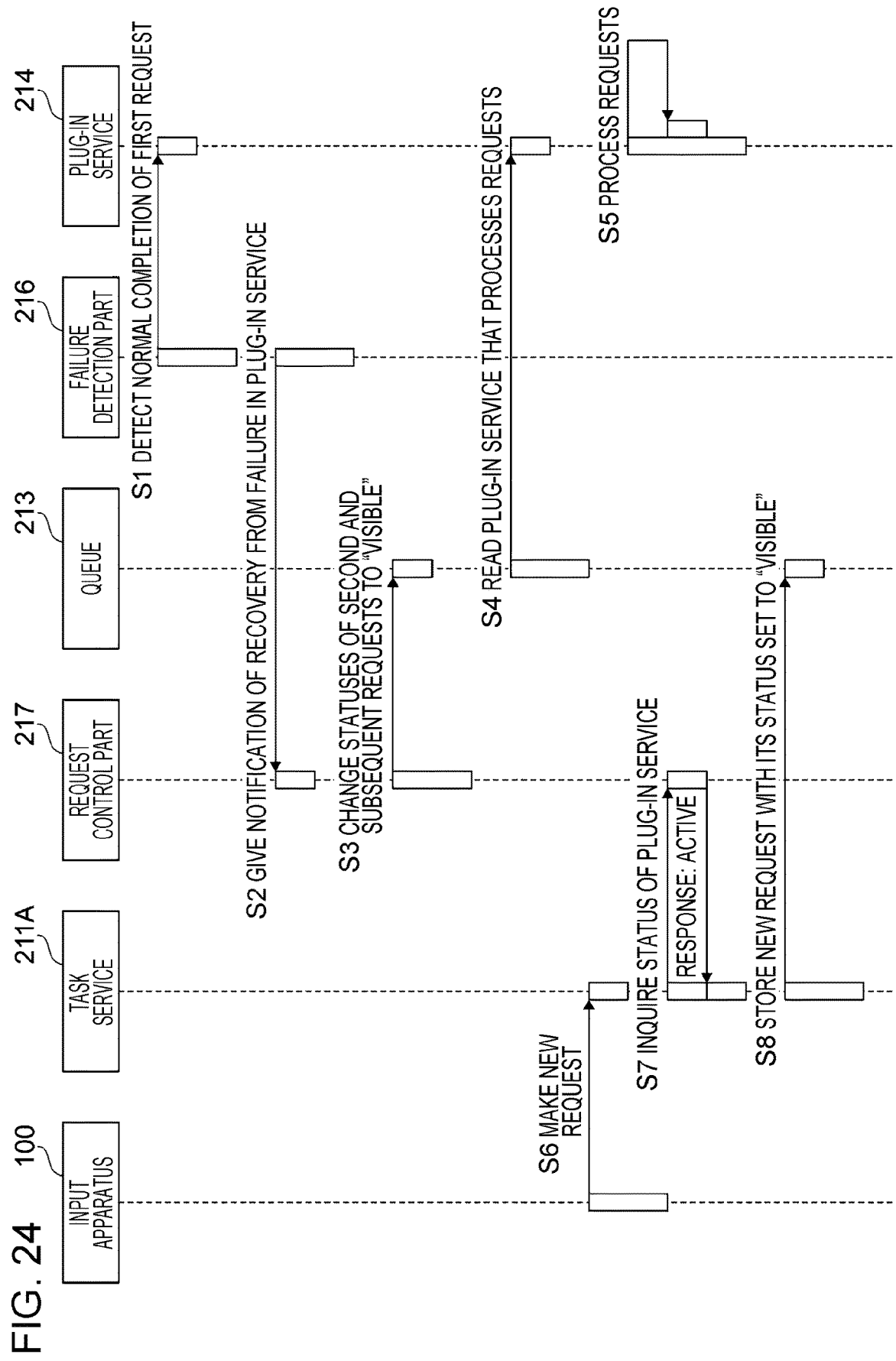
FIG. 24 illustrates an example of a sequence in a case in which recovery from failure has been detected.

FIG. 24 illustrates an example of a sequence in a case in which recovery from failure has been detected.

The sequence illustrated in FIG. 24 shows communication between the input apparatus 100, the task service 211A, the queue 213, the plug-in service 214, the failure detection part 216, and the request control part 217.

Step 1

The failure detection part 216 detects normal completion of the first request. The normal completion corresponds to normal completion of processing by the plug-in service 214 in which failure is detected. For example, the failure detection part 216 detects normal completion of the processing executed in Step 3 of FIG. 20.

Step 2

The failure detection part 216 notifies the request control part 217 of recovery from the failure in the plug-in service in which the normal completion has been detected.

Figure 25:
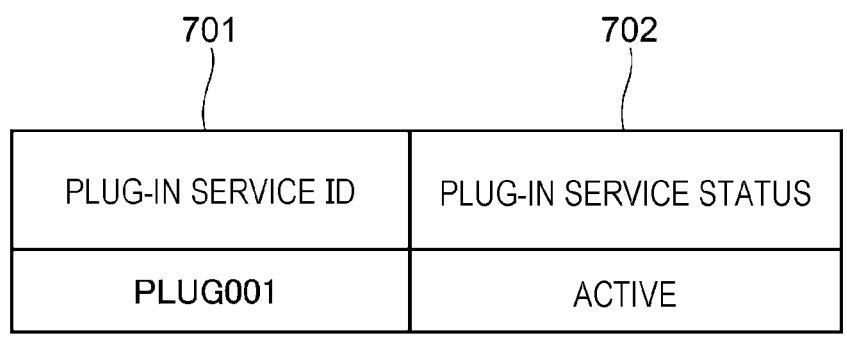
FIG. 25 illustrates the data structure of a recovery notification.

FIG. 25 illustrates the data structure of the recovery notification. The recovery notification includes a plug-in service ID 701 for identifying the plug-in service 214 that has recovered from the failure and a plug-in service status 702.

In the case of FIG. 25, the plug-in service ID 701 is "PLUG001" and the plug-in service status 702 is "active".

Step 3

The request control part 217 notified of the recovery from the failure changes the statuses of the second and subsequent requests to "visible".

FIG. 26 illustrates an example of the status table 500 after the processing of Step 3 of FIG. 24.

In FIG. 26, parts corresponding to those in FIG. 21 are represented by the corresponding reference symbols.

In the case of FIG. 26, all the statuses of the requests managed as "REQ00002" and "REQ00004" to become "invisible" in FIG. 21 are changed to "visible".

In the example of FIG. 26, the statuses of the plug-in services 214 corresponding to those requests are also changed from "inactive" to "active".

Step 4

The queue 213 calls the plug-in service 214 that processes the requests.

Step 5

The called plug-in service 214 processes the requests.

Step 6

The task service 211A receives a new request from the input apparatus 100.

Step 7

The task service 211A inquires of the request control part 217 about the status of the plug-in service 214 to be used by the received request. The task service 211A receives a response "active".

Step 8

The task service 211A stores the new request in the queue 213 with its status set to "visible".

FIG. 27 illustrates an example of the status table 500 after the processing of Step 8 of FIG. 24.

In FIG. 27, parts corresponding to those in FIG. 26 are represented by the corresponding reference symbols.

In the case of FIG. 27, the new request is managed as "REQ00005". The plug-in service 214 for use in processing of "REQ00005" is "PLUG001". The status is "active".

Thus, "visible" is stored as the status of the request managed as "REQ00005" and "active" is stored as the status of the plug-in service 214.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A relay system, comprising:
a detector that detects occurrence of failure related to a processor that reads and processes requests from a memory;
a monitor that monitors statuses of the requests stored in the memory and gives an instruction to increase or reduce a computational resource depending on the statuses of the requests stored in the memory; and
a controller that performs control in response to detection of the failure by the detector so that a status of the requests are set to a state in which the monitor determines that addition of the computational resource is unnecessary,
wherein the controller performs control so that a status of a request that is being processed in association with the processor related to the detected failure is set to a state in which the processor is not able to acquire the request that is being processed from the memory,
wherein when the detector has detected that the failure no longer occurs, the controller changes the status of the request held in the memory from the state in which the processor is not able to acquire the request from the memory to a state in which the processor is able to acquire the request from the memory.

2. The relay system according to claim 1, wherein the controller performs control so that a status of a request that is stored in the memory and is waiting for execution of the processor in which the failure has been detected is set to a state in which the request is not acquirable from the memory.

3. The relay system according to claim 1, wherein the controller performs control so that a status of a request that is stored in the memory and is waiting for execution of the processor in which the failure has been detected is set to a state in which the request is not acquirable from the memory.

4. The relay system according to claim 1, wherein the controller performs control in response to the detection of the failure so that the number of requests stored in the memory appears not to exceed a predetermined value.

5. The relay system according to claim 1, wherein, when the failure has been detected in the processor that processes a request before the request is stored in the memory, the controller performs control so that the status of the request generated after the detection of the failure and stored in the memory is set to a state in which the processor is not able to acquire the request from the memory.

6. The relay system according to claim 1, wherein, when the failure has been detected in the processor that processes a request before the request is stored in the memory, the controller performs control so that the status of the request generated after the detection of the failure and stored in the memory is set to a state in which the processor is not able to acquire the request from the memory.

7. The relay system according to claim 2, wherein, when the failure has been detected in the processor that processes a request before the request is stored in the memory, the controller performs control so that the status of the request generated after the detection of the failure and stored in the memory is set to a state in which the processor is not able to acquire the request from the memory.

8. The relay system according to claim 3, wherein, when the failure has been detected in the processor that processes a request before the request is stored in the memory, the controller performs control so that the status of the request generated after the detection of the failure and stored in the memory is set to a state in which the processor is not able to acquire the request from the memory.

9. The relay system according to claim 1, wherein, when the failure has been detected in the processor that processes the requests, the controller discards a request generated after the detection of the failure without writing the request in the memory.

10. The relay system according to claim 1, wherein, when the failure has been detected in the processor that processes the requests, the controller discards a request generated after the detection of the failure without writing the request in the memory.

11. The relay system according to claim 2, wherein, when the failure has been detected in the processor that processes the requests, the controller discards a request generated after the detection of the failure without writing the request in the memory.

12. The relay system according to claim 3, wherein, when the failure has been detected in the processor that processes the requests, the controller discards a request generated after the detection of the failure without writing the request in the memory.

13. A relay system, comprising:
detection means for detecting occurrence of failure related to a processor that reads and processes requests from a memory;
monitoring means for monitoring statuses of the requests stored in the memory and giving an instruction to increase or reduce a computational resource depending on the statuses of the requests stored in the memory; and
control means for performing control in response to detection of the failure by the detection means so that a status of the requests are set to a state in which the monitoring means determines that addition of the computational resource is unnecessary,
wherein the control means performs control so that a status of a request that is being processed in association with the processor related to the detected failure is set to a state in which the processor is not able to acquire the request that is being processed from the memory,
wherein when the detection means has detected that the failure no longer occurs, the control means changes the status of the request held in the memory from the state in which the processor is not able to acquire the request from the memory to a state in which the processor is able to acquire the request from the memory.

* * * * *